US008565985B2

(12) United States Patent
Nakagawa et al.

(10) Patent No.: US 8,565,985 B2
(45) Date of Patent: Oct. 22, 2013

(54) TRANSMISSION CONTROL DEVICE AND METHOD FOR WORKING VEHICLE

(75) Inventors: Tomohiro Nakagawa, Hirakata (JP); Shigeru Yamamoto, Hirakata (JP); Kenjiro Shimada, Komatsu (JP)

(73) Assignee: Komatsu Ltd., Tokyo (JP)

( * ) Notice: Subject to any disclaimer, the term of this patent is extended or adjusted under 35 U.S.C. 154(b) by 431 days.

(21) Appl. No.: 12/675,811

(22) PCT Filed: Oct. 7, 2008

(86) PCT No.: PCT/JP2008/068198
§ 371 (c)(1),
(2), (4) Date: Mar. 1, 2010

(87) PCT Pub. No.: WO2009/054256
PCT Pub. Date: Apr. 30, 2009

(65) Prior Publication Data
US 2010/0256877 A1 Oct. 7, 2010

(30) Foreign Application Priority Data
Oct. 22, 2007 (JP) ................................. 2007-273720

(51) Int. Cl.
*F16H 61/14* (2006.01)
*G06F 19/00* (2011.01)

(52) U.S. Cl.
USPC .................. 701/50; 701/48; 701/51; 701/57; 701/67; 477/70; 477/176; 74/335; 192/218

(58) Field of Classification Search
USPC ........... 701/50, 51, 52, 53, 54, 61, 62, 64, 67, 701/68, 79, 84, 87, 90, 95, 110, 34.2, 1, 48, 701/57; 123/350; 477/43, 70, 92, 122, 125, 477/176, 8; 74/335, 60; 192/218; 290/45
See application file for complete search history.

(56) References Cited

U.S. PATENT DOCUMENTS 4,393,732 A * 7/1983 Suzuki et al. .................. 477/125
4,417,307 A * 11/1983 Kubo et al. ...................... 701/62
(Continued)

FOREIGN PATENT DOCUMENTS

JP 03-36554 U 4/1991
JP 05-93429 A 4/1993
(Continued)

OTHER PUBLICATIONS

European Search Report of corresponding EP Application No. 08 84 2764.6 dated Nov. 24, 2010.

*Primary Examiner* — Tuan C. To
*Assistant Examiner* — Yuri Kan
(74) *Attorney, Agent, or Firm* — Global IP Counselors, LLP

(57) ABSTRACT

A transmission control device includes a load increase rate computation portion and a transmission control portion. The load increase rate computation portion is configured to compute an increase rate of a load acting on the work vehicle. The transmission control portion is configured to shift a high-speed gear down to a low-speed gear with producing a lock-up state in which a lock-up clutch is engaged when the load increase rate is less than a load increase rate threshold in shifting the high-speed gear down to the low-speed gear, and producing a torque converter state in which the lock-up clutch is disengaged when the load increase rate is equal to or greater than the load increase rate threshold in shifting the high-speed gear down to the low-speed gear.

6 Claims, 4 Drawing Sheets

(56) References Cited

U.S. PATENT DOCUMENTS

| | | | |
|---|---|---|---|
| 4,610,179 A * | 9/1986 | Parker | 74/335 |
| 4,622,866 A * | 11/1986 | Ito et al. | 477/122 |
| 4,630,508 A * | 12/1986 | Klatt | 701/54 |
| 4,847,767 A * | 7/1989 | Carton et al. | 701/67 |
| 4,892,014 A * | 1/1990 | Morell et al. | 477/92 |
| 5,038,287 A * | 8/1991 | Taniguchi et al. | 701/99 |
| 5,058,013 A * | 10/1991 | Iwatsuki et al. | 701/101 |
| 5,095,435 A * | 3/1992 | Tokoro et al. | 701/68 |
| 5,683,329 A * | 11/1997 | Kono et al. | 477/176 |
| 5,806,642 A * | 9/1998 | Harada et al. | 192/218 |
| 6,044,317 A * | 3/2000 | Taffin | 701/57 |
| 6,081,042 A * | 6/2000 | Tabata et al. | 290/45 |
| 6,085,137 A * | 7/2000 | Aruga et al. | 701/51 |
| 6,135,915 A * | 10/2000 | Aoki et al. | 477/43 |
| 6,183,391 B1 | 2/2001 | Iijima | |
| 6,205,388 B1 * | 3/2001 | Henneken et al. | 701/51 |
| 6,219,608 B1 * | 4/2001 | Abo et al. | 701/51 |
| 6,243,638 B1 * | 6/2001 | Abo et al. | 701/51 |
| 6,246,940 B1 * | 6/2001 | Ochiai et al. | 701/51 |
| 6,292,730 B1 * | 9/2001 | Takizawa et al. | 701/51 |
| 6,360,154 B1 * | 3/2002 | Krenn et al. | 701/54 |
| 6,366,843 B1 * | 4/2002 | Dreibholz et al. | 701/51 |
| 6,449,552 B2 * | 9/2002 | Ohba et al. | 701/89 |
| 6,597,978 B1 * | 7/2003 | Dreibholz et al. | 701/51 |
| 6,676,561 B2 * | 1/2004 | Fritzer et al. | 477/70 |
| 6,708,097 B1 * | 3/2004 | Vohmann et al. | 701/68 |
| 6,832,147 B2 * | 12/2004 | Vornehm et al. | 701/54 |
| 2001/0002452 A1 * | 5/2001 | Bacher et al. | 701/67 |
| 2001/0020207 A1 * | 9/2001 | Lohrenz | 701/57 |
| 2001/0025536 A1 * | 10/2001 | Nishimura | 74/335 |
| 2001/0056318 A1 * | 12/2001 | Tashiro et al. | 701/48 |
| 2002/0038647 A1 * | 4/2002 | Tashiro et al. | 123/350 |
| 2004/0025610 A1 * | 2/2004 | Paquet et al. | 74/60 |
| 2004/0043862 A1 * | 3/2004 | Kadota et al. | 477/8 |
| 2006/0089776 A1 * | 4/2006 | Segawa et al. | 701/67 |
| 2006/0161324 A1 * | 7/2006 | Ozawa et al. | 701/50 |
| 2007/0173984 A1 * | 7/2007 | Nakayama | 701/1 |
| 2010/0256877 A1 * | 10/2010 | Nakagawa et al. | 701/50 |

FOREIGN PATENT DOCUMENTS

| | | |
|---|---|---|
| JP | 11-108175 A | 4/1999 |
| JP | 2000-205409 A | 7/2000 |

\* cited by examiner

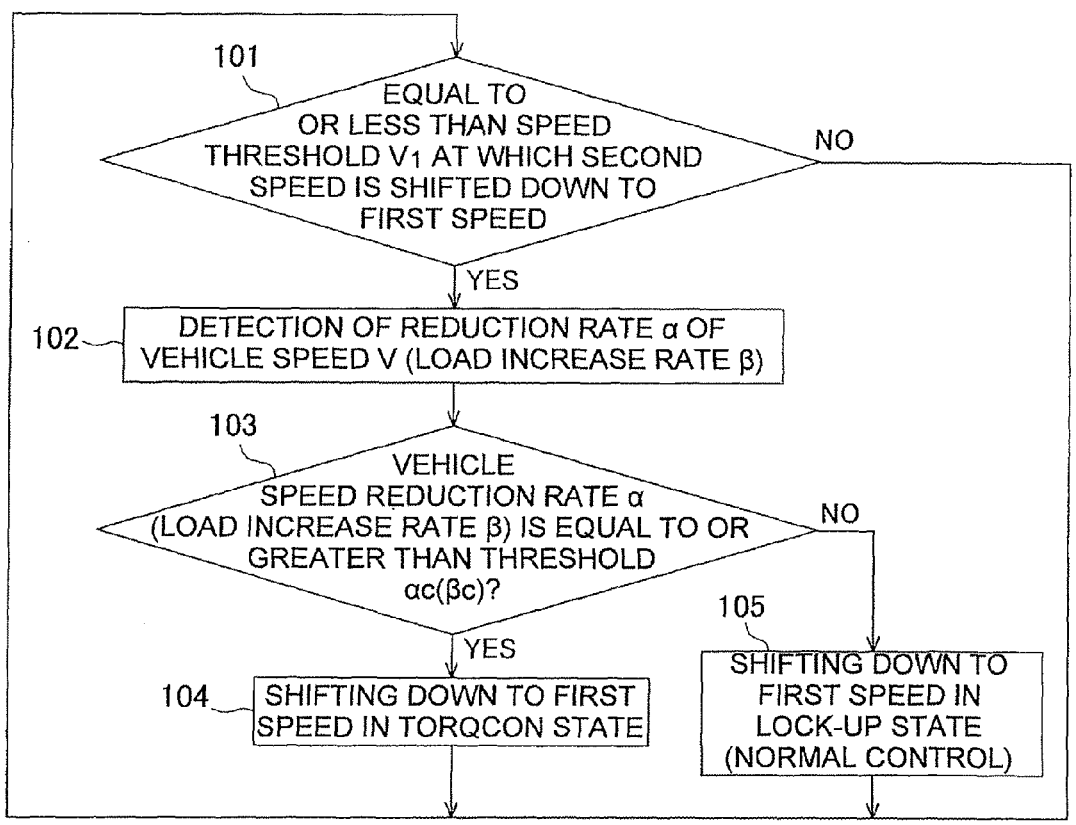
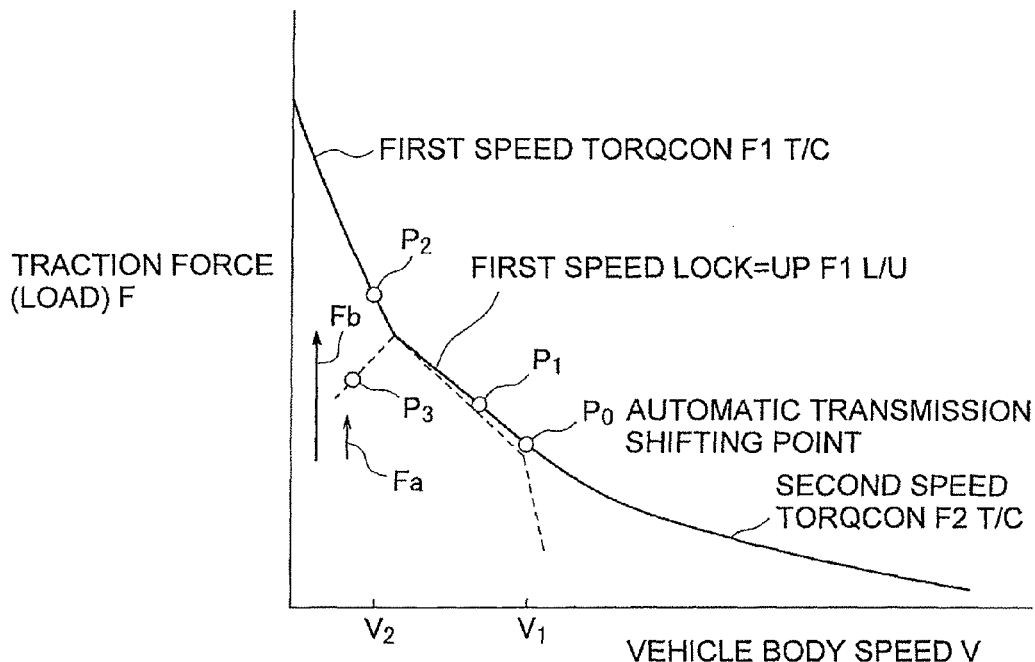

TRANSMISSION CONTROL DEVICE AND METHOD FOR WORKING VEHICLE

CROSS-REFERENCE TO RELATED APPLICATIONS

This national phase application claims priority to Japanese Patent Application No. 2007-273720 filed on Oct. 22, 2007. The entire disclosures of Japanese Patent Application No. 2007-273720 is hereby incorporated herein by reference.

TECHNICAL FIELD

The present invention relates to a transmission control device and a transmission control method for a work vehicle provided with a work implement in which output of an engine is transmitted to a travel device via a torque converter or a lock-up clutch and subsequently a transmission, wherein a high-speed gear of the transmission is shifted down to a low-speed gear in accordance with reduction in vehicle speed.

BACKGROUND ART

The bulldozer generally includes a work implement, an engine, a power transmission unit and a travel device. The power transmission unit includes a transmission and a torque converter assembly with a lock-up clutch. The power transmission unit is configured to transmit an output of an engine to the travel device via a torque converter or a lock-up clutch of the torque converter assembly with a lock-up clutch and subsequently the transmission. The bulldozer further includes a transmission control device for shifting a high-speed gear of the transmission down to a low-speed gear in accordance with reduction in a vehicle speed. The travel device is made up of crawler belts. The torque converter assembly with a lock-up clutch is disposed between the engine and the transmission. When a load acts on the crawler belts, that is, when force acts on the crawler belts to the extent that rotation of the crawler belts are prevented, the torque converter of the torque converter assembly with a lock-up clutch is configured to change driving force of the crawler belts by automatically and continuously changing torque to be transmitted to the transmission in accordance with variation in the load. The torque converter can inhibit variation in engine speed even if large load acts on the crawler belts to the extent that the crawler belt cannot rotate. Accordingly, stall of the engine can be prevented.

The lock-up clutch of the torque converter assembly with a lock-up clutch is disposed between the engine and the transmission. Simultaneously, the lock-up clutch is aligned parallel to the torque converter of the torque converter assembly with a lock-up clutch. To compensate power loss in the torque converter, the lock-up clutch is configured to produce a lock-up state (clutch engagement state) by directly coupling a pump and a turbine of the torque converter at a speed range that a characteristic of the torque converter is not required. In the present specification, the lock-up state refers to a state that a lock-up clutch is turned on and engaged, whereas a torque converter state refers to a state that the lock-up clutch is turned off and disengaged and power is transmitted through fluid within the torque converter.

In the bulldozer, the lock-up clutch is automatically activated depending on conditions. Specifically, the lock-up clutch is automatically turned on (performs an engagement action) or turned off (performs a disengagement action) depending on conditions.

The transmission is configured to selectively perform engagement/disengagement actions of a forward clutch F, a reverse clutch R and speed gear clutches (i.e., first speed $1^{st}$, second speed $2^{nd}$ and third speed $3^{rd}$) in accordance with a desired travel direction, required driving force and required speed (vehicle speed).

An operator's cab of the bulldozer is provided with a forward/reverse selection handle lever and a transmission shift lever. It is possible to select shift ranges including the forward F, the reverse R, and the gears of the first speed, the second speed and the third speed through the operation of the forward/reverse selection handle lever and the transmission shift lever.

For example, when the forward/reverse selection handle lever is shifted to a "forward" position, whereas the transmission shift lever is shifted to a "second speed" position, an automatic transmission shifting is executed by the transmission control device under the condition that the forward second speed is set to be the maximum speed gear unless the forward/reverse selection handle lever and the transmission shift lever are shifted to the other positions.

The following is a typical transmission shift pattern to be executed in the bulldozer when the shift range "second speed" is selected.

Transmission shift pattern 1: depending on reduction in vehicle speed, a second speed in a lock-up state is shifted to a second speed in a torque converter state; the second speed in a torque converter state is then shifted to a first speed in a lock-up state; and the first speed in a lock-up state is finally shifted to a first speed in a torque converter state.

Transmission shift pattern 2: depending on reduction in vehicle speed, the second speed in a lock-up state is shifted to the first speed in a lock-up state; and the first speed in a lock-up state is shifted to the first speed in a torque converter state.

When the second speed is shifted down to the first speed, the lock-up state is produced in both of the aforementioned transmission shift patterns.

The bulldozer performs an excavation work while pushing soil of the ground with the work implement (e.g., blade). In the excavation work, most of the work requires large driving force (traction force) at low speed. Therefore, the bulldozer normally performs a work under the condition that the shift range "second speed" is selected by operating the transmission shift lever. Then, transmission shifting is executed along with the aforementioned transmission shift patterns.

In a heavy excavation work requiring quite large driving force (traction force), for instance, when the work implement is plunged into the ground, the second speed is shifted down to the first speed in a torque converter state via the first speed in a lock-up state.

In the lock-up state, good torque transmission efficiency is achieved in the torque converter assembly with a lock-up clutch. Additionally, the fuel amount consumption of the engine can be reduced. Therefore, it is desirable to cause the bulldozer to perform a work in a lock-up state as long as possible under the condition that the required traction force can be achieved and an engine stall is prevented.

When the aforementioned transmission shift patterns are adopted, the lock-up state is produced in shifting the second speed down to the first speed. Accordingly, the bulldozer can execute a work in the first lock-up state until the first lock-up state is shifted to the first torque converter state. Consequently, the aforementioned demand can be fulfilled.

The following Japan Laid-Open Patent Publication No. JP-A-H05-093429 discloses an invention of a bulldozer including a torque converter assembly with a lock-up clutch.

The bulldozer is configured to control the transmission shifting for achieving an optimum gear depending on magnitude of load and control turning-on/turning-off of the lock-up clutch for achieving optimum traction force depending on magnitude of load.

SUMMARY

No problem particularly occurs when load acting on a vehicle body is gently increased in shifting the second speed down to the first speed. However, a problem occurs when load acting on the vehicle body is rapidly increased in shifting the second speed down to the first speed, for instance, when the work implement is plunged into a large pile of soil. In this case, even when the second speed is shifted down to the first lock-up state, the first lock-up state is shifted to the first torque converter state in a quite short period of time. Therefore, shift shocks of a transmission are continuously produced in the vehicle body in two stages. The first shift shock is produced in shifting the second speed down to the first speed in a lock-up state. The second shift shock is subsequently produced in shifting the first speed in a lock-up state to the first speed in a torque converter state. The two-stage shift shock not only has a negative impact on the vehicle body but also makes an operator of the vehicle feel uncomfortable. Therefore, it is necessary to inhibit the two-stage shift shock.

Furthermore, when the second speed is shifted down to the first speed in a lock-up state under the condition that load acting on the vehicle body is rapidly increased, the rapid load directly acts on the engine while the vehicle body almost stops moving. Accordingly, engine speed falls rapidly and torque is reduced. Reduction in engine speed and torque cannot be recovered soon even if the first speed in a lock-up state is subsequently shifted to the first torque converter state. Accordingly, the vehicle slows down while sufficient traction force is not produced in the vehicle body (travel device, wheels and surrounding components). Consequently, there are still chances that shift shock is produced. Further, there are chances that engine stall occurs in some cases.

The present invention is produced in view of the above. It is an object of the present invention to cause a work vehicle to execute a work in a lock-up state as long as possible where both of a good torque transmission efficiency and a good fuel economy may be achieved. Simultaneously, it is an object of the present invention to inhibit shock to be produced in rapidly shifting a high-speed gear down to a low-speed gear due to load rapidly acting on a vehicle body and to inhibit reduction in engine speed and torque at the low-speed gear.

A first aspect of the present invention relates to a transmission control device of a work vehicle. The work vehicle is herein composed of an engine, a travel device, and a power transmission unit. The transmission control device is configured to shift a high-speed gear of the transmission to a low-speed gear in accordance with reduction in a vehicle speed. The transmission control device includes load increase rate computation portion and transmission control portion. The power transmission unit includes a torque converter, a lock-up clutch, and a transmission. The power transmission unit is configured to transmit an output of the engine to the travel device via either the torque converter or the lock-up clutch, and subsequently via the transmission. The load increase rate computation portion is configured to compute an increase rate of a load acting on the work vehicle. The transmission control portion is configured to shift the high-speed gear down to the low-speed gear with producing a lock-up state in which the lock-up clutch is engaged when the load increase rate is less than a load increase rate threshold in shifting the high-speed gear down to the low-speed gear. The transmission control portion is also configured to shift the high-speed gear down to the low-speed gear with producing a torque converter state in which the lock-up clutch is disengaged when the load increase rate is equal to or greater than the load increase rate threshold in shifting the high-speed gear to the low-speed gear.

A second aspect of the present invention relates to a speed-control device of a work vehicle. The work vehicle is herein composed of an engine, a travel device and a power transmission unit. The transmission control device is configured to shift a high-speed gear of the transmission down to a low-speed gear in accordance with reduction in a vehicle speed. The transmission control device includes acceleration detection portion and transmission control portion. The power transmission unit includes a torque converter, a lock-up clutch and a transmission. The power transmission unit is configured to transmit an output of the engine to the travel device via the torque converter or the lock-up clutch and subsequently the transmission. The acceleration detection portion is configured to detect a reduction rate of a speed of the work vehicle. The transmission control portion is configured to shift the high-speed gear down to the low-speed gear with producing a lock-up state that the lock-up clutch is engaged when the vehicle speed reduction rate is less than a vehicle speed reduction rate threshold in shifting the high-speed gear down to the low-speed gear. The transmission control portion is also configured to shift the high-speed gear down to the low-speed gear with producing a torque converter state that the lock-up clutch is disengaged when the vehicle speed reduction rate is equal to or greater than the vehicle speed reduction rate threshold in shifting the high-speed gear down to the low-speed gear.

A third aspect of the present invention relates to the transmission control device of a work vehicle according to the first aspect. In the transmission control device, the transmission control portion is configured to shift a second-speed in a torque converter state to a first-speed in a lock-up state when the load increase rate is less than the load increase rate threshold in shifting the second speed down to the first speed. The transmission control portion is also configured to shift the second-speed in a torque converter state to a first-speed in a torque converter state when the load increase rate is equal to or greater than the load increase rate threshold in shifting the second speed down to the first speed.

A fourth aspect of the present invention related to the transmission control device of a work vehicle according to the second aspect. In the transmission control device, the transmission control portion is configured to shift a second-speed in a torque converter state to a first-speed in a lock-up state when the vehicle speed reduction rate is less than the vehicle speed reduction rate threshold in shifting the second speed down to the first speed. The transmission control portion is also configured to shift the second-speed in a torque converter state to a first-speed in a torque converter state when the vehicle speed reduction rate is equal to or greater than the vehicle speed reduction rate threshold in shifting the second speed down to the first speed.

A fifth aspect of the present invention relates to a transmission control method for controlling a transmission of a work vehicle. In the work vehicle, an output of an engine is transmitted to a travel device via either a torque converter or a lock-up clutch, and subsequently via a transmission.

In the transmission control method, a high-speed gear of the transmission is configured to be shifted down to a low-speed gear in accordance with reduction in a vehicle speed. The transmission control method includes computing an increase rate of a load acting on the work vehicle, and shifting the high-speed gear to the low-speed gear with producing a lock-up state in which the lock-up clutch is engaged when the increase rate of the load acting on the work vehicle is less than a load increase rate threshold in shifting the high-speed gear down to the low-speed gear, and producing a torque converter state in which the lock-up clutch is disengaged when the increase rate of the load acting on the work vehicle is equal to or greater than the load increase rate threshold in shifting the high-speed gear down to the low-speed gear.

A sixth aspect of the present invention relates to a transmission control method for controlling a transmission of a work vehicle. In the work vehicle, an output of an engine is transmitted to a travel device via either a torque converter or a lock-up clutch, and subsequently via a transmission. In the transmission control method, a high-speed gear of the transmission is shifted down to a low-speed gear in accordance with reduction in a vehicle speed. The transmission control method includes computing a reduction rate of a speed of the work vehicle, and shifting the high-speed gear down to the low-speed gear with producing a lock-up state in which the lock-up clutch is engaged when the reduction rate of the speed of the work vehicle is less than a vehicle speed reduction rate threshold in shifting the high-speed gear down to the low-speed gear, and producing a torque converter state in which the lock-up clutch is disengaged when the reduction rate of the speed of the work vehicle is equal to or greater than the vehicle speed reduction rate threshold in shifting the high-speed gear down to the low-speed gear.

BRIEF DESCRIPTION OF THE DRAWINGS

FIG. 1 also illustrates some components of a bulldozer's composition, which are related to the embodiment of the present invention.

FIG. 2 is a flowchart for showing a procedure of processing to be executed in a controller.

FIG. 3 is a chart for showing a relation between a vehicle body speed and a traction force (load).

DETAILED DESCRIPTION OF THE EMBODIMENTS

An embodiment of the present invention will be hereinafter explained with reference to figures.

Figure 1:
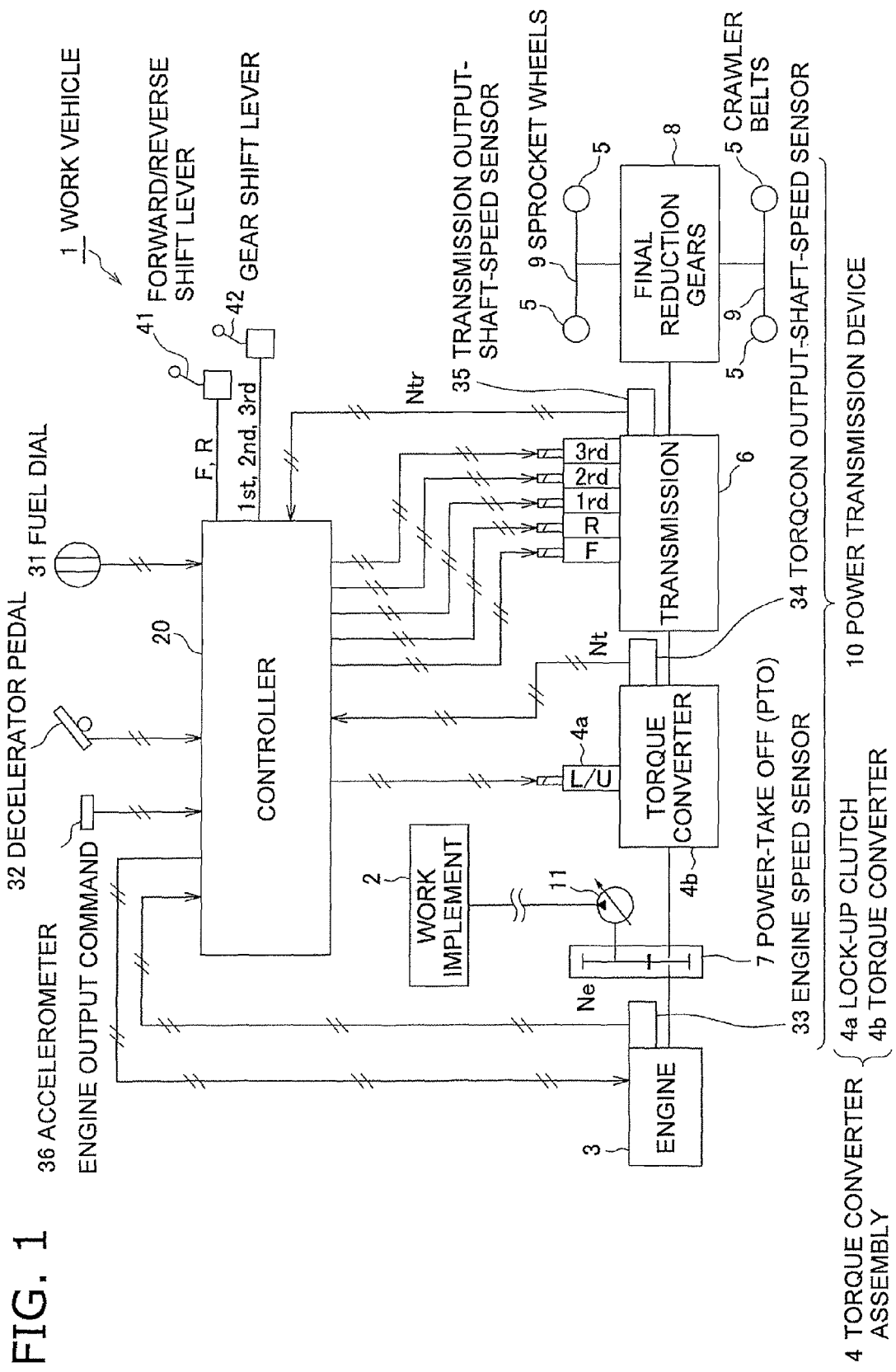
FIG. 1 is a block diagram for illustrating a composition of a transmission control device for a work vehicle of an embodiment.

FIG. 1 is a block diagram for illustrating a composition of a transmission control device for a work vehicle of the present embodiment. FIG. 1 especially focuses on some components of a bulldozer's composition, which are related to the embodiment of the present invention.

As illustrated in FIG. 1, the vehicle of the present embodiment is composed of a work implement 2 including a blade, an engine 3 made up of a diesel engine, a travel device 5 composed of crawler belts, a power transmission unit 10, and a controller 20. The controller 20 functions as a transmission control device. The power transmission unit 10 includes a transmission 6 and a torque converter assembly 4 with a lock-up clutch. The power transmission unit 10 is configured to transmit output of the engine 3 to the travel device 5 via either a lock-up clutch 4a or a torque converter 4b of the torque converter assembly 4 with a lock-up clutch.

The controller 20 is configured to shift a gear of the transmission 6 from a high-speed gear down to a low-speed gear in response to reduction in a vehicle speed V.

As illustrated in FIG. 1, the driving force transmission unit 10 includes sequentially arranged components from the engine 3 to crawler belts 5 of a work vehicle 1. The driving force transmission unit 10 specifically includes a power take-off (PTO) 7, the torque converter assembly 4 with a lock-up clutch, the transmission 6, a final reduction gears 8 and sprocket wheels 9. The transmission 6 is composed of a forward clutch F, a reverse clutch R and speed gear clutches $1^{st}$, $2^{nd}$ and $3^{rd}$. In the work vehicle 1, an output shaft of the engine 3 is coupled to the power take-off 7. The power take-off 7 is coupled to the lock-up clutch 4a and a pump of the torque converter 4b of the torque converter assembly 4 with a lock-up clutch. Further, the power take-off 7 is couple to a hydraulic pump 11.

Output (torque) of the engine 3 is partially transmitted to the crawler belts 5 via the power take-off 7, either the lock-up clutch 4a or the pump and a turbine of the torque converter 4b of the torque converter assembly 4 with a lock-up clutch, the transmission 6, the final reduction gears 8, and the sprocket wheels 9. On the other hand, rest of the output of the engine 3 is transmitted to the hydraulic pump 11 via the power take-off 7. Accordingly, the hydraulic pump 11 is driven and discharges hydraulic oil. The discharged hydraulic oil is transferred to a hydraulic actuator (not illustrated in the figure) via a control valve (not illustrated in the figure). The work implement 2, including the blade, is thus actuated. Here, the hydraulic actuator functions as a lift cylinder and the like.

The torque converter assembly 4 with a lock-up clutch is disposed between the engine 3 and the transmission 6. When load, which is force for preventing rotation of the crawler belts 5, acts on the crawler belts 5, the torque converter 4b of the torque converter assembly 4 with a lock-up clutch is configured to change driving force of the crawler belts 5 by automatically and continuously changing torque to be transmitted to the transmission 6 in accordance with variation of the load. The torque converter 4b can reduce variation in speed of the engine 3, even when large load acts on the crawler belts 5 to the extent that the crawler belts 5 cannot thereby rotate. Therefore, the torque converter 4b can prevent the engine 3 from stopping (stalling). A characteristic of a torque ratio Et with respect to a speed ratio e, which is a performance characteristic of the torque converter 4b, is stored in the controller 20. The speed ratio e herein refers to a ratio of an output shaft speed Nt of the torque converter 4b to an input shaft speed Ne of the torque converter 4b. On the other hand, the torque ratio Et is herein refers to a ratio of an output torque Tto of the torque converter 4b to an input torque Tti of the torque converter 4b. The input shaft speed Ne is the same as the engine speed Ne to be detected by an engine speed sensor 33. The output shaft speed Nt is detected by a torque converter output-shaft-speed sensor 34.

The lock-up clutch 4a of the torque converter assembly 4 with a lock-up clutch is disposed between the engine 3 and the transmission 6. Additionally, the lock-up clutch 4a is disposed in parallel to the torque converter 4b of the torque converter assembly 4 with a lock-up clutch. To cover power loss in the torque converter 4b, the lock-up clutch 4a is configured to establish a lock-up state (clutch engagement state) by directly coupling the pump and the turbine of the torque converter 4b at a speed range that a characteristic of the torque converter 4b is not required. In the specification of the present application, a lock-up state refers to a state that the lock-up clutch 4a is turned on and is engaged. On the other hand, a torque converter state refers to a state that the lock-up clutch 4a is turned off and is disengaged and power is transmitted by means of fluid in the interior of the torque converter 4b.

In the bulldozer, the lock-up clutch 4a is automatically activated depending on conditions. In other words, the lock-up clutch 4a is automatically turned on (performs an engagement action) and turned off (performs a disengaged action) depending on conditions. The lock-up clutch 4a is made up of a hydraulic clutch. The lock-up clutch 4a of the present embodiment is configured to be engaged (turned on) when the clutch pressure is high, whereas it is configured to be disengaged (turned off) when the clutch pressure is low.

The transmission 6 selectively performs an engagement/disengagement action of the forward clutch F, the reverse clutch R, the first speed, second speed and third speed gear clutches $1^{st}$, $2^{nd}$ and $3^{rd}$ depending on a travel direction, a required driving force and a required speed (vehicle speed). Each of the clutches of the transmission 6 is made up of a hydraulic clutch. Each of the clutches of the transmission 6 of the present embodiment is configured to be engaged when the clutch pressure is high, whereas it is configured to be disengaged when the clutch pressure is low.

The controller 20 controls an engagement/disengagement action of the lock-up clutch 4a and the forward clutch F, the reverse clutch R, and the speed gear clutches $1^{st}$, $2^{nd}$, and $3^{rd}$ of the transmission 6.

A fuel dial 31 and a decelerator pedal 32 are disposed in an operator's cab of the work vehicle 1.

The fuel dial 31 is operated by an operator. A signal, indicating target engine speed, is accordingly inputted into the controller 20. The target engine speed herein corresponds to the operating amount of the fuel dial 31.

The decelerator pedal 32 is operated (i.e., pressed down) by the operator. A signal, indicating a decelerated engine speed, is accordingly inputted into the controller 20. The decelerated engine speed herein corresponds to the operating amount (i.e., pressed-down amount) of the decelerator pedal 32.

The engine 3 is provided with the engine speed sensor 33. The engine speed sensor 33 detects an actual speed Ne of the engine 3. A signal, indicating the speed Ne detected by the engine speed sensor 33, is inputted into the controller 20.

The output shaft of the torque converter 4 is provided with the torque converter output-shaft-speed sensor 34. The torque converter output-shaft-speed sensor 34 detects a speed Nt of the output shaft of the torque converter 4. A signal, indicating the speed Nt detected by the torque converter output-shaft-speed sensor 34, is inputted into the controller 20. Instead of the torque converter output-shaft-speed sensor 34, a transmission output-shaft-speed sensor 35 may be provided to the output shaft of the transmission 6. In this case, a signal, indicating a speed Ntr of the output shaft of the transmission 6, may be configured to be inputted into the controller 20. In the controller 20, an actual speed V of the work vehicle 1 (i.e., vehicle speed V) is measured based on the torque converter output shaft speed Nt detected by the torque converter output-shaft-speed sensor 34 and a deceleration ratio from the output shaft of the torque converter 4 to the crawler belts 5. When the transmission output-shaft-speed sensor 35 is used, the vehicle speed V is measured based on the transmission output shaft speed Ntr detected by the transmission output-shaft-speed sensor 35 and the speed reduction ratio from the output shaft of the transmission 6 to the crawler belts 5.

The controller 20 controls the engine 3 by transmitting an engine output command to the engine 3 in order to achieve the target speed corresponding to the operating amount of the fuel dial 31. The engine 3 is a diesel engine, and the engine output is controlled by regulating the amount of fuel to be injected into a cylinder. The regulation is performed by controlling a governor attached to a fuel injection pump of the engine 3. An all-speed control governor is herein used as the governor. The governor regulates the engine speed and the amount of fuel injection in accordance with a load in order to achieve the target speed corresponding to the operating amount of the fuel dial. In other words, the governor increases/decreases the amount of fuel injection for eliminating a difference between the target engine speed and the actual engine speed. The control is executed based on the sensing signal Ne of the engine speed sensor 33. Further, the controller 20 stores a characteristic map of the engine output torque with respect to the engine speed.

Furthermore, the controller 20 controls the speed Ne of the engine 3 in accordance with the operating amount (i.e., pressed-down amount) of the decelerator pedal 32 in order to reduce the speed Ne of the engine 3.

The operator's cab of the work vehicle 1 is provided with a forward/reverse shift lever 41 and a gear shift lever 42. Shift ranges, including the forward F, the reverse R, the first speed, second speed and third speed gears $1^{st}$, $2^{nd}$ and $3^{rd}$ of the transmission 6, can be selected by the operation of the forward/reverse shift lever 41 and the gear shift lever 42.

A forward traveling gear (the forward clutch F) or a reverse traveling gear (the reverse clutch R) is selected depending on an operation position of the forward/reverse shift lever 41. A forward/rearward position signal, indicating an operation position (i.e., the forward position "F" and the reverse position "R") of the forward/reverse shift lever 41, is inputted into the controller 20.

A shift range, which is a gear shifting range, is selected depending on an operation position of the gear shift lever 42. The selected positions of the gear shift lever 42 are composed of shift ranges "first speed", "second speed" and "third speed", for instance. The shift range "second speed" refers to a shift range position that an automatic transmission shifting is executed while the second speed '$2^{nd}$' is fixed as the maximum speed gear. Similarly, the shift range "third speed" refers to a shift range position that an automatic transmission shifting is executed while the third speed '$3^{rd}$' is fixed as the maximum speed gear.

A shift range signal, indicating an operation position of the gear shift lever 42 (i.e., shift ranges "first speed", "second speed" and "third speed"), is inputted into the controller 20. When a work (e.g., excavation work) is executed at a low speed, the gear shift lever 42 is normally operated in the shift range "second speed."

Figure 4:
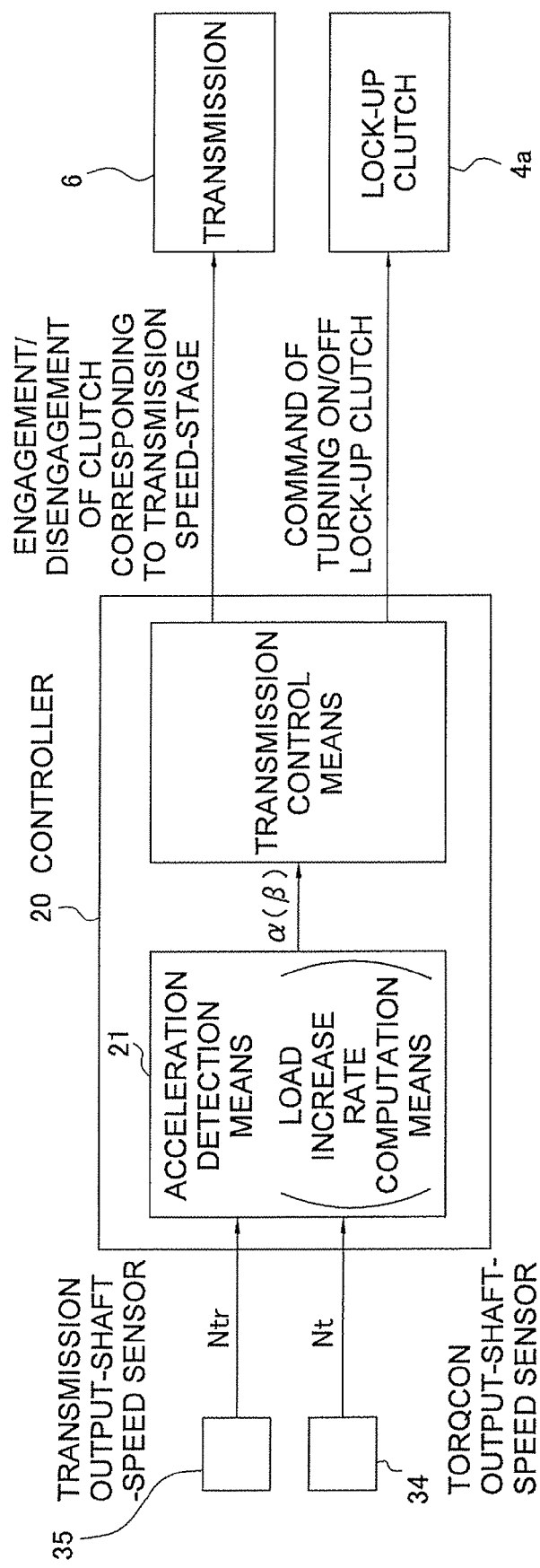
FIG. 4 is a block diagram for illustrating some components of the controller's composition, which are related to the embodiment of the present invention.

FIG. 4 is a block diagram for illustrating some components of internal composition of the controller 20, which are related to the embodiment of the present invention.

The controller 20 is provided with acceleration detection portion 21 and transmission control portion 22.

The acceleration detection portion 21 detects a reduction rate α of the vehicle speed V of the work vehicle 1. A detection value, detected by an accelerometer 36 installed in the vehicle body, is used as the vehicle speed reduction rate (acceleration) α.

Alternatively, the vehicle speed reduction rate α may be configured to be computed based on a measurement value of the vehicle speed V. In this case, the acceleration detection portion 21 detects the reduction rate (acceleration) a of the vehicle speed V based on the vehicle speed V measured as described above. The vehicle speed reduction rate α is computed by the following expression (1). For example, past 20 vehicle speeds Vs (i.e., V19, V18, V17, V16 . . . . V0), traced back from the present vehicle speed V19, are measured based at every sampling period (e.g., 0.01 seconds). Then, the vehicle speed reduction rate (acceleration) α is computed based on the vehicle speeds V19, V18, V17, V16 . . . . V0. In other words, the vehicle speed reduction rate α is computed by subtracting sum of 10-times vehicle speeds Vs (i.e., sum of V9, V8, . . . and V0) from sum of the subsequent 10-times vehicle speeds Vs (i.e., sum of V19, V18, . . . and V10) and then dividing the obtained value by 10.

$$\alpha = ((\Sigma V19, V18, V17 \ldots V10) - (\Sigma V9, V8, V7 \ldots V0))/10 \quad (1)$$

Note that the vehicle speed reduction rate (acceleration) α is computed based on the vehicle speed V in the above expression. However, the output shaft speed Nt of the torque converter 4 to be detected by the torque converter output-shaft-speed sensor 34 may be used instead of the vehicle speed V. Alternatively, the output shaft speed Ntr of the transmission to be detected by the transmission output-shaft-speed sensor 35 may be used instead.

The transmission control portion 22 of the controller 20 controls hydraulic oil to be supplied to a clutch of the transmission 6 corresponding to a selected position of the forward/reverse shift lever 41 and the gear shift lever 42. Accordingly, the clutch is selectively engaged in response to the supply of hydraulic oil. The transmission control portion 22 also controls on/off of the lock-up clutch 4a.

The controller 20 executes a transmission shift control of the present embodiment to be described based on a value of the vehicle speed reduction rate α when the second speed is shifted down to the first speed.

The following example explains a case that a normal transmission shift control is executed under the aforementioned transmission shift pattern 1.

FIG. 3 shows a relation between the vehicle body speed V and the traction force (load) F. In FIG. 3, settings of symbols are as follows: F2T/C indicates a characteristic of the traction force F under the condition that the forward clutch F and the speed gear clutch $2^{nd}$ (forward second speed: F2) are selectively engaged in the transmission 6 and the lock-up clutch 4a performs a disengagement act (the torque converter state: T/C); F1L/U indicates a characteristic of the traction force F under the condition that the forward clutch F and the speed gear clutch $1^{st}$ (forward first speed: F1) are selectively engaged in the transmission 6 and the lock-up clutch 4a performs an engagement action (the lock-up state: L/U); and F1T/C indicates a characteristic of the traction force F under the condition that the forward clutch F and the speed gear clutch $1^{st}$ (forward first speed: F1) are selectively engaged in the transmission 6 and the lock-up clutch 4a performs a disengagement action (the torque converter state: T/C).

FIG. 2 is a flowchart for showing a procedure of the processing to be executed in the controller 20.

First, it is determined whether or not the vehicle speed V is reduced to be equal to or less than a speed threshold V1 at which the second speed is shifted down to the first speed (Step 101).

Next, a reduction rate α of the vehicle speed V of the work vehicle 1 is detected (Step 102). The vehicle speed reduction rate α is detected based on acceleration of the work vehicle 1 to be measured by the accelerometer 36 installed in the work vehicle 1. Alternatively, the speed reduction rate α may be computed based on the measured value of the vehicle speed V.

Next, the detected vehicle speed reduction rate α is compared with a vehicle speed reduction rate threshold αc. Specifically, it is determined whether or not the vehicle speed reduction rate α is equal to or greater than the vehicle speed reduction rate threshold αc (Step 103).

As a result, a control is executed for shifting a characteristic of F2T/C to a characteristic of F1L/U in FIG. 3 when it is determined that the vehicle speed V is equal to or less than the speed threshold V1 at which the second speed is shifted down to the first speed and the vehicle speed reduction rate α is less than the vehicle speed reduction rate threshold αc, that is, when the reduction rate α of the vehicle speed V is gentle in shifting the second speed down to the first speed and an increase amount (Fa) of the traction force (load) F per unit time is accordingly small as illustrated in FIG. 3 (YES in determination of Step 101, No in determination of Step 103). In other words, when the second speed is shifted down to the first speed at an automatic transmission shifting point P0, the lock-up clutch 4a is turned on and the second speed in a torque converter state is shifted to the first speed in a lock-up state. Accordingly, torque of the engine 3 and torque of the torque converter assembly 4 with a lock-up clutch are matched at a point P1 on the characteristic F1L/U of the first speed in a lock-up state (Step 105). Note that when the vehicle speed V is eventually further reduced to be equal to or less than a vehicle speed threshold V2 at which the first speed in a lock-up state is shifted to the first speed in a torque converter state, the lock-up clutch 4a is turned off and the first speed in a lock-up state is shifted to the first speed in a torque converter state. Accordingly, torque of the engine 3 and torque of the torque converter assembly 4 with a lock-up clutch are matched at a point P2 on the characteristic F1T/C of the first speed in a torque converter state. As described above, when the vehicle speed reduction rate α is small, a transmission shift is executed in accordance with the aforementioned transmission shift pattern 1 (normal control).

On the other hand, a control is executed for shifting the characteristic F2T/C to the characteristic F1T/C in FIG. 3 when it is determined that the vehicle speed V is reduced to be equal to or less than the speed threshold V1 at which the second speed is shifted down to the first speed and the vehicle speed reduction rate α is equal to or greater than the vehicle speed reduction rate threshold αc, that is, when the vehicle speed V is rapidly reduced in shifting the second speed down to the first speed (Yes in determination of Step 101, Yes in determination of Step 103). In terms of the traction force, the above control is executed when an increase amount (Fb) of the traction force (load) F per unit time is large as shown with Arrow Fb in FIG. 3. In short, the lock-up clutch 4a remains to be disengaged when the second speed is shifted down to the first speed, and the second speed in a torque converter state is shifted to the first speed in a torque converter state. Accordingly, torque of the engine 3 and torque of the torque converter assembly 4 with a lock-up clutch are matched at the point P2 on the characteristic F1T/C of the first speed in a torque converter state (Step 104). As described above, when the vehicle speed reduction rate α is large, a transmission shift is executed in accordance with the aforementioned transmission shift pattern 1 while the first speed in a lock-up state is skipped.

In the aforementioned embodiment, determination is executed based on the reduction rate α of the vehicle speed V that is regarded as a load increase rate. However, determination can be executed based on a directly computed load increase rate. In this case, load increase rate computation portion 21 is provided instead of the acceleration detection portion 21 in the block chart of FIG. 4. The load increase rate computation portion 21 herein computes an increase rate β of load acting on the work vehicle 1. The load increase rate β can be computed as an increase rate of output torque of the torque converter assembly 4 with a lock-up clutch. The output torque of the torque converter assembly 4 can be computed by the following expression (2).

$$Tto = Teo \times Et \qquad (2)$$

Here, Tto is output torque of the torque converter assembly 4. Teo is engine output torque (equals to input torque of the torque converter 4b). Teo is obtained from an engine speed-engine output torque characteristic map stored in the controller 20. Et is a torque ratio, which can be uniquely obtained from a speed ratio e of the torque converter 4b and a speed ratio-torque ratio characteristic map of the torque converter 4b that is stored in the controller 20. Note that the speed ratio e of the torque converter 4b is obtained from the input shaft speed Ne of the torque converter 4b to be measured by the engine speed sensor 33 and the output shaft speed Nt of the torque converter 4b to be measured by the torque converter output-shaft-speed sensor 34.

Alternatively, the load increase rate β may be obtained as an increase rate of the traction force F. The traction force F can be obtained by the following expression (3).

$$F = (\text{coefficient}) \times Tto \times R \times K / (L \times Z) \qquad (3)$$

Here, Tto indicates output torque of the aforementioned torque converter assembly 4; R indicates overall speed reduction ratio of the power transmission unit 10; K indicates a power transmission efficiency from the input shaft of the transmission 6 to the sprocket wheels 9; L indicates a link pitch of the crawler belts 5; and Z indicates the number of meshing teeth of the sprocket wheels 9.

In the flowchart of FIG. 2, after the increase rate β of load acting on the work vehicle 1 is computed (Step 102), it is determined whether or not the load increase rate β is equal to or greater than the load increase rate threshold βc (Step 103). When it is consequently determined that the increase rate β of load acting on the work vehicle 1 is less than the load increase rate threshold βc in shifting the second speed down to the first speed, the second speed is shifted down to the first speed while the lock-up state is produced by turning on the lock-up clutch 4a. On the other hand, when it is determined that the load increase rate β is equal to or greater than the load increase rate threshold βc in shifting the second speed down to the first speed, the second speed is shifted down to the first speed while the torque converter state is produced by keeping disengagement of the lock-up clutch (Steps 103, 104 and 105 in FIG. 2).

As described above, when the load increase rate β is small, a transmission shift is executed in accordance with the aforementioned transmission shift pattern 1 (normal control). On the other hand, when the load increase rate β is large, a transmission shift is executed in accordance with the aforementioned transmission shift pattern 1 while the first speed in a lock-up state is skipped.

Next, advantageous effects of the present embodiment will be hereinafter explained.

According to the present embodiment, when increase in load acting on the vehicle body is gentle in shifting the second speed down to the first speed, the second speed is shifted down to the first speed in a lock-up state. The work vehicle can conduct a work in the first speed in a lock-up state until the first speed in a lock-up state is shifted to the first speed in a torque converter state. Therefore, the work vehicle can conduct a work under the condition that a torque transmission efficiency is good in the torque converter assembly 4 with a lock-up clutch and the fuel consumption amount of the engine is low.

On the other hand, when load acting on the vehicle body is rapidly increased in shifting the second speed down to the first speed (e.g., when the work implement is plunged into a large pile of soil), the second speed is shifted down to the first speed in a torque converter state. Therefore, it is possible to inhibit "two-stage transmission shift shock" to be caused when the second speed is shifted down to the first speed in a lock-up state and the first speed in a lock-up state is then immediately shifted to the first speed in a torque converter state as seen in the conventional art.

Figure 5:
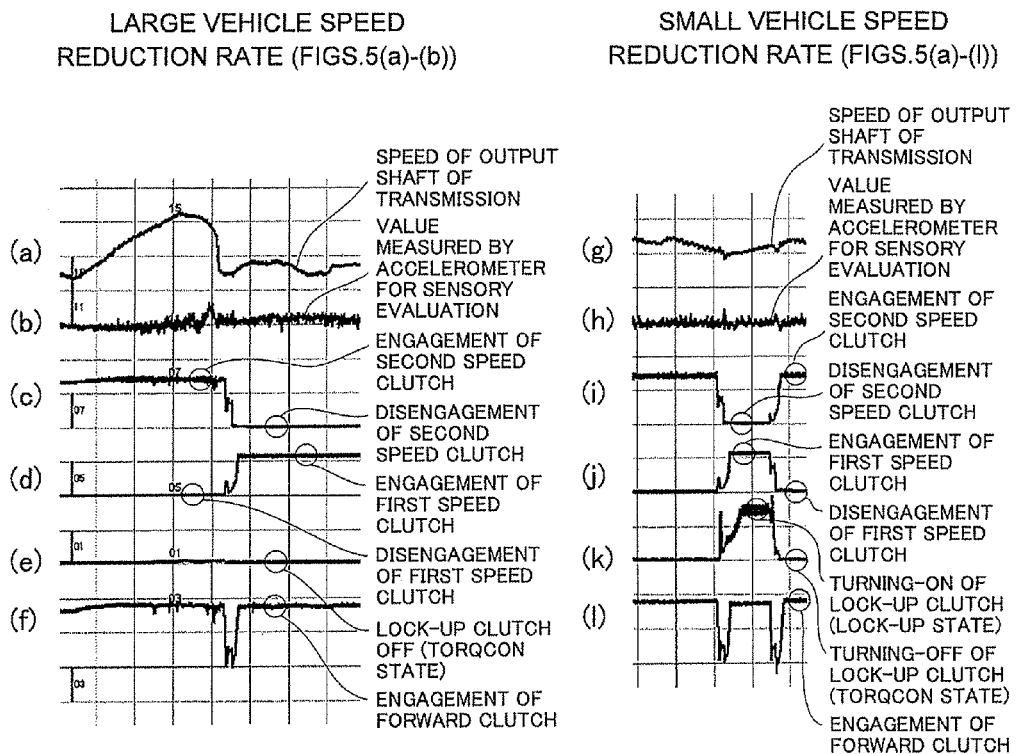
FIG. 5(a)-(l) are timing diagrams for showing data of an experiment executed for testing advantageous effects of the embodiment.

FIG. 5 is a group of timing diagrams showing data of an experiment conducted for testing advantageous effects of the present embodiment. FIGS. 5(a), 5(b), 5(c), 5(d), 5(e) and 5(f) correspond to data that the vehicle speed reduction rate α is large in shifting the second speed down to the first speed. On the other hand, FIGS. 5(g), 5(h), 5(i), 5(j), 5(k) and 5(l) correspond to data that the vehicle speed reduction rate α is small in shifting the second speed down to the first speed. A time line is shown by the horizontal axis in each of the timing diagrams. The time line is also common amongst the timing diagrams. In the experiment, an accelerometer is installed in the work vehicle 1 for a sensory evaluation. A transmission shift shock to be given to an operator is for a sensory evaluation based on magnitude of amplitude of the accelerometer.

FIGS. 5(a) and 5(g) respectively show a time-series variation in the speed Ntr of the output shaft of the transmission 6. FIGS. 5(b) and 5(h) respectively show output (amplitude) of the accelerometer for a sensory evaluation. FIGS. 5(C) and 5(i) respectively show a time-series variation in the clutch pressure of the second speed gear clutch $2^{nd}$. FIGS. 5(d) and 5(j) respectively show a time-series variation in the clutch pressure of the first speed gear clutch $1^{st}$. FIGS. 5(e) and 5(k) respectively show a time-series variation of the clutch pressure of the lock-up clutch 4a. FIGS. 5(f) and 5(l) respectively show a time-series variation in the clutch pressure of the forward clutch F.

As is obvious from the charts, when the reduction rate α of the vehicle speed V is large in shifting the second speed down to the first speed, the accelerometer measures acceleration of a the same level for both a transmission shift in a torque converter state and that in a lock-up state. Therefore, it was revealed that a shift shock to be given to a vehicle body and an operator is quite small and it does not make the operator feel uncomfortable.

Furthermore, according to the present embodiment, the second speed in a torque converter state is shifted to the first speed in a torque converter state without shifting to the first speed in a lock-up state while load acting on the vehicle body is suddenly increased as seen in the conventional art. Therefore, load does not suddenly and directly act on the engine while the vehicle body is in an almost static condition. Accordingly, it is possible to inhibit acute reduction in the engine speed and reduction in torque.

FIG. 3 shows a trajectory of matching points between torques in the conventional art using a dashed line L. The conventional art herein indicates a case that the second speed is shifted down to the first speed in a lock-up state while load acting on the vehicle body is suddenly increased. As shown with the dashed line L, load is suddenly increased in the first speed in a lock-up state. Therefore, the engine speed is suddenly decreased and the traction force F is suddenly reduced (Matching point P3). According to the present embodiment, on the other hand, the traction force F is increased in accordance with the reduction in the vehicle speed V without sudden reduction in the engine speed and the traction force F.

Accordingly, torques are matched at the point P2 on the characteristic F1L/U of the first speed in a torque converter state.

According to the present embodiment, the work vehicle can conduct a work under the condition that the lock-up state is kept as long as possible and both good torque transmission efficiency and good fuel economy are achieved. Furthermore, it is possible to inhibit shock in shifting the high-speed gear down to the low-speed gear and reduction in torque and engine speed at the low-gear.

Note that the aforementioned embodiment assumes that a transmission shift is executed using the transmission shift pattern 1 in the normal control. However, the present invention can be applied to a case that a transmission shift is executed using the aforementioned transmission shift pattern 2 in the normal control. In this case, when the vehicle speed reduction rate α or the load increase rate β is small in shifting the second speed in a lock-up state down to the first speed, the second speed in a lock-up state is shifted down to the first speed in a lock-up state. On the other hand, when the vehicle speed reduction rate α or the load increase rate β is large in shifting the second speed in a lock-up state down to the first speed, the second speed in a lock-up state is shifted down to the first speed in a torque converter state.

Additionally in the aforementioned embodiment, the lock-up clutch 4a is configured to be turned on/off in accordance with the load increase rate β or the vehicle speed reduction rate α in shifting the second speed down to the first speed.

However, it is possible to implement an embodiment that the lock-up clutch is configured to be turned on/off in accordance with a load increase rate or a speed reduction rate in shifting a high-speed gear equal to or higher than a third speed down to a lower gear (e.g., shift-down from the third speed to the second speed). This is because work vehicles of some types conduct a work at a speed gear higher than the first and second speeds.

Note that the present embodiment has been explained under the assumption that the work vehicle 1 is the bulldozer. However, the present invention can be similarly applied to work vehicles excluding the bulldozer as long as the work vehicles are configured to execute an automatic transmission shifting with a structure provided with a lock-up clutch, a torque converter and a transmission.

According to the illustrated embodiment, the work vehicle can conduct a work under the condition that the lock-up state is maintained as long as possible and both good torque transmission efficiency and good fuel economy are achieved. Furthermore, it is possible to inhibit shock in shifting a high-speed gear down to a low-speed gear and reduction in torque and engine speed at a low-speed gear.

The invention claimed is:

1. A transmission control device of a work vehicle composed of an engine, a travel device and a power transmission unit, the power transmission unit including a torque converter, a lock-up clutch and a transmission, the power transmission unit being configured to transmit an output of the engine to the travel device via either the torque converter or the lock-up clutch, and subsequently via the transmission, the transmission control device being configured to shift a high-speed gear of the transmission down to a low-speed gear in accordance with reduction in a vehicle speed, the transmission control device comprising:

a load increase rate computation portion configured to compute an increase rate of a load acting on the work vehicle; and a transmission control portion configured to selectively shift the high-speed gear in a torque converter state, in which the lock-up clutch is disengaged, down to the low-speed gear in the torque converter state via the low-speed gear in a lock-up state, in which the lock-up clutch is engaged, when the load increase rate is less than a load increase rate threshold in shifting the high-speed gear down to the low-speed gear, and shift the high-speed gear in the torque converter state down to the low-speed gear in the torque converter state while skipping the low-speed gear in the lock-up state when the load increase rate is equal to or greater than the load increase rate threshold in shifting the high-speed gear down to the low-speed gear.

2. A transmission control device of a work vehicle composed of an engine, a travel device and a power transmission unit, the power transmission unit including a torque converter, a lock-up clutch and a transmission, the power transmission unit being configured to transmit an output of the engine to the travel device via either the torque converter or the lock-up clutch and subsequently via the transmission, the transmission control device being configured to shift a high-speed gear of the transmission down to a low-speed gear in accordance with reduction in a vehicle speed, the transmission control device comprising:

an acceleration detection portion configured to detect a reduction rate of a speed of the work vehicle; and a transmission control portion configured to selectively shift the high-speed gear in a torque converter state, in which the lock-up clutch is disengaged, down to the low-speed gear in the torque converter state via the low-speed gear in a lock-up state, in which the lock-up clutch is engaged, when the vehicle speed reduction rate is less than a vehicle speed reduction rate threshold in shifting the high-speed gear down to the low-speed gear, and shift the high-speed gear in the torque converter state down to the low-speed gear in the torque converter state while skipping the low-speed gear in the lock-up state when the vehicle speed reduction rate is equal to or greater than the vehicle speed reduction rate threshold in shifting the high-speed gear down to the low-speed gear.

3. The transmission control device of a work vehicle according to claim 1, wherein the transmission control portion is configured to shift a second speed in the torque converter state to a first speed in the lock-up state when the load increase rate is less than the load increase rate threshold in shifting the second speed down to the first speed, and the transmission control portion is configured to shift the second speed in the torque converter state to a first speed in the torque converter state when the load increase rate is equal to or greater than the load increase rate threshold in shifting the second speed down to the first speed.

4. The transmission control device of a work vehicle according to claim 2, wherein the transmission control portion is configured to shift a second speed in the torque converter state to a first speed in the lock-up state when the vehicle speed reduction rate is less than the vehicle speed reduction rate threshold in shifting the second speed down to the first speed, and the transmission control portion is configured to shift the second speed in the torque converter state to a first speed in the torque converter state when the vehicle speed reduction rate is equal to or greater than the vehicle speed reduction rate threshold in shifting the second speed down to the first speed.

5. A transmission control method for controlling a transmission of a work vehicle in which an output of an engine is transmitted to a travel device via either a torque converter or a lock-up clutch, and subsequently via a transmission, where a high-speed gear of the transmission is configured to be shifted down to a low-speed gear in accordance with reduction in a vehicle speed, the transmission control method comprising:

computing, via a load increase rate computation portion, an increase rate of a load acting on the work vehicle; and shifting the high-speed gear in a torque converter state, in which the lock-up clutch is disengaged, down to the low-speed gear in the torque converter state via the low-speed gear in a lock-up state, in which the lock-up clutch is engaged, when the increase rate of the load acting on the work vehicle is less than a load increase rate threshold in shifting the high-speed gear down to the low-speed gear, and shifting the high-speed gear in the torque converter state down to the low-speed gear in the torque converter state while skipping the low-speed gear in the lock-up state when the increase rate of the load acting on the work vehicle is equal to or greater than the load increase rate threshold in shifting the high-speed gear down to the low-speed gear.

6. A transmission control method for controlling a transmission of a work vehicle in which an output of an engine is transmitted to a travel device via either a torque converter or a lock-up clutch, and subsequently via a transmission, where a high-speed gear of the transmission is shifted down to a low-speed gear in accordance with reduction in a vehicle speed, the transmission control method comprising:

computing, via an acceleration detection portion, a reduction rate of speed of the work vehicle; and shifting the high-speed gear in a torque converter state, in which the lock-up clutch is disengaged, down to the low-speed gear in the torque converter state via the low-speed gear in a lock-up state in which the lock-up clutch is engaged when the reduction rate of the speed of the work vehicle is less than a vehicle speed reduction rate threshold in shifting the high-speed gear down to the low-speed gear, and shifting the high-speed gear in the torque converter state down to the low-speed gear in the torque converter state while skipping the low-speed gear in the lock-up state when the reduction ratio of the speed of the work vehicle is equal to or greater than the vehicle speed reduction ratio threshold in shifting the high-speed gear down to the low-speed gear.

* * * * *